Figure 1:
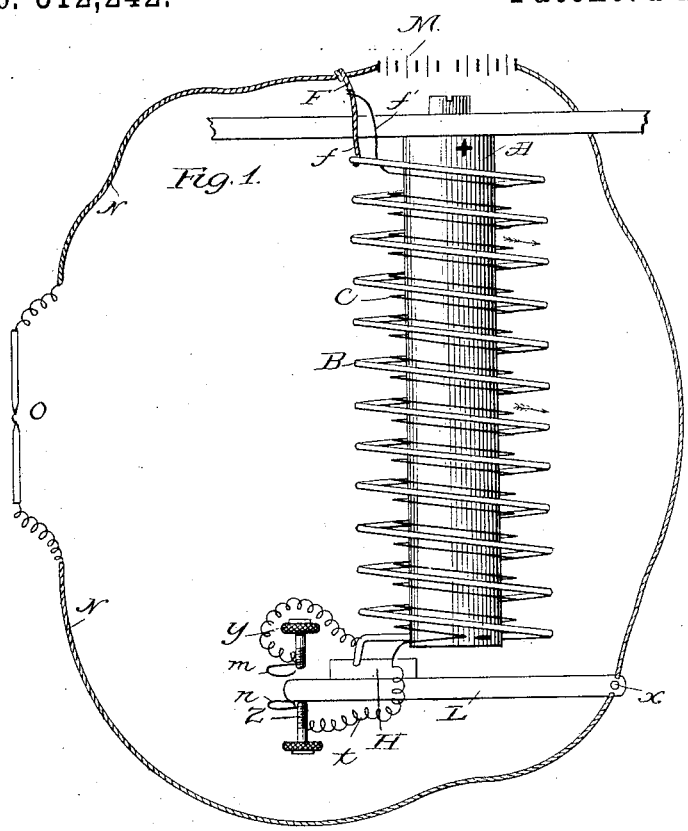

(No Model.)

S. H. SHORT.
CUT-OUT FOR ELECTRIC APPARATUS.

No. 312,242. Patented Feb. 10, 1885.

UNITED STATES PATENT OFFICE.

SIDNEY H. SHORT, OF DENVER, COLORADO.

CUT-OUT FOR ELECTRIC APPARATUS.

SPECIFICATION forming part of Letters Patent No. 312,242, dated February 10, 1885.

Application filed January 31, 1884. (No model.)

*To all whom it may concern:*

Be it known that I, SIDNEY H. SHORT, of Denver, in the county of Arapahoe and State of Colorado, have invented a new and useful Improvement in Cut-Outs for Electric Apparatus; and I do hereby declare that the following is a full, clear, and exact description of the same.

My invention consists of a special form of apparatus for cutting out an electric lamp or other electrical receptive apparatus from a circuit whenever by any accident it is caused to break the circuit or offer too high resistance.

The accompanying drawing shows the apparatus in side elevation with a diagram of the electrical connections.

In this drawing, A represents a permanent magnet consisting of a bar of steel with its negative pole downward when the current is made to flow as represented by the arrows in the figure.

Instead of the polarized bar I may use as an equivalent magnetic metal having the power to become a magnet under the influence of the current in the coils of wire around it. The magnet is surrounded by two coiled springs, one within the other.

M represents the machine or battery, and N N the main circuit, in which at O is an arc lamp or other receptive apparatus. The inner coil, C, is made of fine wire, and offers considerable resistance to the electric current. The outside coiled spring, B, is made of large coarse wire, and offers very little resistance to the electric current. Two or more sets of these spiral springs may be used, the sets being connected in multiple arc. The coarser coil also may be on the inside and the finer on the outside. The current from the generator or battery enters both of these coils at their upper ends by the branches $f$ $f'$ from main branch F, and these currents are parallel to each other and in the same direction.

It is a well-known fact that parallel currents in the same direction attract each other, and the effect of these currents traveling around the permanent magnet would be to move the convolutions of the coils closer together, and the two forces acting together would lift the lower ends of the springs upward.

The object in using a permanently-polarized core is this, that the action of the current in the magnetic field of that magnet will also tend to move the spirals together, and will assist the parallel currents in accomplishing the result heretofore described. A soft-iron core put into the place of the permanently-polarized core would become a magnet when the current passed around it, and would operate in the same way, but not with so good effect. To the lower ends of these springs is attached a block of insulating material, H. This block is fastened to a lever, L, pivoted at X in the main circuit, its left-hand end resting on the set-screw Z, and a flexible wire, $t$, passes from the small spring-coil C to this set-screw, forming electrical connection between F and lever L. At the pivot X the wire from the other pole of the machine or battery enters, and the current is completed through L, Z, and C to F.

In order that the circuit of the fine wire may not be broken before contact is made for the coarse-wire circuit, a light spring, $m$, is attached to the set-screw Y and a similar spring, $n$, to the set-screw Z. These springs are so adjusted in relation to the lever L that in rising this lever will go into contact with the spring $m$, and thus form electric connections with the coarse coil before it leaves the spring $n$, which forms electrical connections between it and the set-screw and the finer coil. It will be understood that in moving up or down the lever L comes into contact with one spring before it leaves the other, but leaves the spring from which it is moved when it comes into contact with the set-screw. This system is placed in shunt-circuit between the poles of a lamp or other electric receptive device, and on a high resistance being offered by that device sufficient current passes through C to cause the lever L to be pulled up by the action of the parallel currents in C until the lever L comes into contact with the set-screw Y, which breaks the circuit of the fine-wire spring C and causes the current to pass entirely through the flexible wire to the large coil-spring B. As long as the current passes through B the lever L is held firmly against the set-screw Y, and very little resistance is offered to the current. When the circuit is again made in the lamp or other electric receptive apparatus, the current is so reduced in B as to allow the lever to drop back to its original position.

I claim as my invention—

1. In combination with the circuit of an electric lamp or other electric receptive apparatus, a permanent magnet or magnetic bar forming a core, coil-springs, one of large and the other of smaller wire, surrounding said core, and both connected at one end of the coil to the main circuit and at the other end of the coil to suitable set-screws, and a lever connected to the main circuit and attached by insulating connections to the ends of the coils, whereby the passage of the current through the two coils is made to move the lever out of connection with one coil and into connection with the other, substantially as described.

2. In combination with the main circuit of an electric lamp or other electric receptive apparatus, the core A, the coils B C, connected to the main line by branches $f\ f'$ and at the other end to the set-screws Y and Z, the lever L, connected to the lower ends of the coils by insulating-blocks H, the said lever having its connection with the circuit, as shown at X, and extending between the set-screws Y and Z, and the springs $m\ n$, all substantially as described.

In testimony whereof I have signed my name to this specification in the presence of two subscribing witnesses.

SIDNEY H. SHORT.

Witnesses:
M. F. SHORT,
M. N. MEGRUE.